Patented Aug. 22, 1933

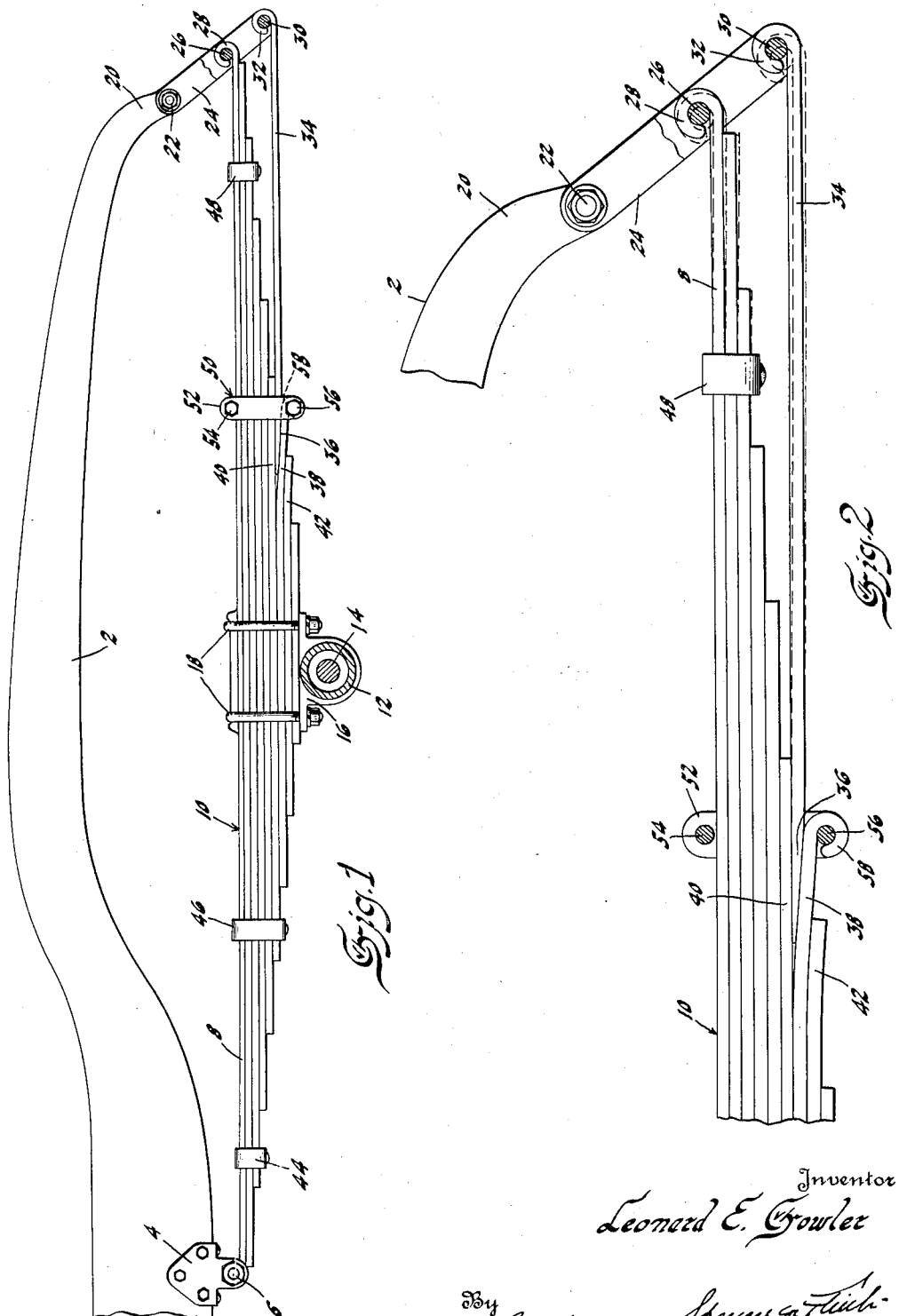

1,923,361

UNITED STATES PATENT OFFICE 1,923,361

SHOCK ABSORBING SPRING

Leonard E. Fowler, Pontiac, Mich., assignor to General Motors Corporation, Detroit, Mich., a Corporation of Delaware Application March 11, 1929. Serial No. 346,050

11 Claims. (Cl. 267—48)

This invention relates to shock absorbing devices or spring action modifiers and is particularly adaptable to the multiple leaf springs used on vehicles.

Spring action modifiers which increase the frictional resistance between the leaves of the springs as the springs move either above or below their normal position are known, and the present invention relates to spring action modifiers of this type. In spring action modifiers of the kind to which the invention relates the more the multiple leaf spring is arched or bowed, from its normal position, the greater will be the tendency of the spring action modifier to increase the frictional resistance between the leaves of the springs and accordingly stiffen the spring to absorb the shock or blow.

The object of the invention is accomplished by extending the shackle of the usual spring to a point well beyond the pivot of the spring. To the extremity of the shackle there is pivoted the eye of a single leaf spring, the end of which is tapered and is positioned between the leaves of the multiple leaf spring. Adjacent the end of the single leaf spring one of the leaves of the multiple leaf spring is provided with an eye in which there is journalled a clip which extends about the leaf spring. The eye is preferably bent somewhat away from the main portion of the spring in order to allow for an easy insertion of the tapered end. As the multiple leaf spring is arched or bowed away from its normal horizontal position the shackle end will swing the single leaf spring inwardly to force the tapered end tighter between the leaves to thereby increase the frictional resistance between the leaves. This will stiffen the spring and absorb the shock.

Referring to the drawing:

Fig. 1 shows the rear portion of the chassis of an automotive vehicle with the invention applied thereto.

Fig. 2 is an enlarged view of the right hand portion of Fig. 1 showing in dotted lines the position of the single leaf spring when the multiple leaf spring is bowed or arched.

Referring to the drawing the numeral 2 indicates any suitable frame but in the drawing it denotes the rear portion of the chassis side bar of a vehicle. To the chassis side bar there is secured the usual bracket 4 to which there is pivoted the eye 6 of the upper leaf 8 of the multiple leaf spring 10. At the mid portion of the spring there is rigidly mounted the rear axle housing 12 in which there is received the driving axle 14. The axle housing 12 is rigidly mounted to the spring by means of the bracket 16 to which are secured the U-bolts 18 passing around the spring's mid portion.

The end 20 of the chassis frame has pivoted thereto as at 22 the double armed spring shackle 24. The shackle has the pivot at 26 for the reception of the eye 28 at the opposite end of the upper leaf 8.

The shackle 24 extends beyond the pivot 26 and has the second pivot 30 at its end portion. Surrounding the pivot 30 is the eye 32 of the single leaf spring or bar 34, the other end of which is tapered as shown at 36 and extends between the leaves 38 and 40 of the spring 10.

As is better shown in Fig. 2, the leaf 38 as well as the leaf 42 immediately therebeneath are preferably slightly bent away from the main spring at their end portions in order to allow for the easy interposition of the tapered end 36 of the leaf 34.

The multiple leaf spring 10 has secured therearound at a plurality of points, the clips 44, 46, 48 and 50. The clip 50 is of special formation and comprises the side members 52 held together at their extremities by a pair of bolts 54 and 56. Surrounding the lower bolt 56 is an eye 58 which is formed on the end of the leaf 38, in order that the action of the tapered end 36 of the leaf 34 will not interfere with or move the clip 50 from its position, and also will force the wedging or tighter engagement of the leaves when the tapered end is forced therebetween.

By referring to Fig. 2 it will be noted that the dotted line position shows the new position assumed by the spring or bar 34 in case the spring 10 should arch in either direction. This arching will cause a shackle 24 to swing on its pivot 22 and move the end thereof inwardly to force the leaf 34 in the same direction and cause the tapered end 36 to become more tightly wedged between the leaves 38 and 40 to thereby press all of the leaves of the spring 10 tighter together and increases the frictional resistance. This increase in the frictional resistance will stiffen the spring and absorb the shock or blow transmitted from the road wheels.

The tapered end 36 may be positioned between any two leaves, but in practice it is preferably positioned as shown.

I claim:

1. In a shock absorbing device, a multiple leaf spring pivoted at one end to a frame, a shackle pivoted to the frame and to the other end of said spring, a leaf spring pivoted at one end to said shackle and having its opposite end disposed and terminating between the leaves of said multiple leaf spring.

2. In a shock absorbing device, a frame, a multiple leaf spring pivoted at one end to said frame, a shackle pivoted to said frame and to the other end of said spring, a leaf spring having one end pivoted to said shackle but spaced from the end of said multiple leaf spring, said leaf spring having its opposite end interposed relative to the leaves of said multiple leaf spring.

3. In a shock absorbing device, a frame, a multiple leaf spring pivoted at one end to said frame, a shackle pivoted to said frame and to said spring, a second spring pivoted at one end to said shackle, said pivots spaced from each other, and a tapered end on said second spring interposed relative to the leaves of said multiple leaf spring.

4. In a shock absorbing device, a frame, a multiple leaf spring secured at one end to said frame, a spring shackle pivoted to said frame, said spring pivoted at its other end to said shackle, an eye on one of the leaves of said spring, a clip journalled in said eye and extending about said spring and a second spring pivoted to said shackle and having its end passing into said clip.

5. In a shock absorbing device, a frame, a multiple leaf spring secured at one end to said frame, a spring shackle pivoted to said frame, said spring pivoted at its other end to said shackle, an eye on one of the leaves of said spring, a clip journalled in said eye and extending about said spring, and a bar pivoted to said shackle and having its end passing into said clip and interposed relative to the leaves of said multiple leaf spring.

6. In a shock absorbing device, a frame, a multiple leaf spring secured at one end to said frame, a spring shackle pivoted to said frame, said spring pivoted at its other end to said shackle, a clip secured to said spring, and a bar pivoted at one end to said shackle and spaced from said multiple leaf spring, the opposite end of said bar extending through said clip and between the leaves of said multiple leaf spring.

7. In a shock absorbing device, a frame, a multiple leaf spring pivoted at one of its ends to said frame, a shackle pivoted to said frame, said spring pivoted at its other end to said shackle, a clip secured around said spring, an eye on one of the leaves of said spring, said clip pivoted in said eye, a bar pivoted at one of its ends to said shackle, the opposite end of said bar extending through said clip over said eye and between the leaves of said multiple leaf spring.

8. In a shock absorbing device, a multiple leaf spring pivoted at one end to a frame, a shackle pivoted to the frame and to the other end of said spring, a bar pivoted at one end to said shackle and having its opposite end disposed between the leaves of said multiple leaf spring.

9. In a shock absorbing device, a frame, a multiple leaf spring pivoted at one end to said frame, a shackle pivoted to said frame and to the other end of said spring, a bar having one end pivoted to said shackle but spaced from the end of said multiple leaf spring, said bar having its opposite end interposed relative to the leaves of said multiple leaf spring.

10. In a shock absorbing device, a frame, a multiple leaf spring pivoted at one end to said frame, a shackle pivoted to said frame and to said spring, a bar pivoted at one end to said shackle, said pivots spaced from each other, and a tapered end on said bar interposed relative to the leaves of said multiple leaf spring.

11. In a shock absorbing device, a frame, a multiple leaf spring secured at one end to said frame, a spring shackle pivoted to said frame, said spring pivoted at its other end to said shackle, an eye on one of the leaves of said spring, a clip journalled in said eye and extending about said spring and a bar pivoted to said shackle and having its end passing into said clip.

LEONARD E. FOWLER.